(12) United States Patent
Gavish et al.

(10) Patent No.: US 11,936,692 B1
(45) Date of Patent: Mar. 19, 2024

(54) SYSTEMS AND METHODS FOR REMEDIATING ACCESS AND ENFORCING CYBERSECURITY POLICIES ACROSS SAAS PLATFORMS

(71) Applicant: DoControl, Inc, New York, NY (US)

(72) Inventors: Adam Gavish, New York, NY (US); Liel Ran, Kiryat One (IL)

(73) Assignee: DOCONTROL, INC., New York, NY (US)

( * ) Notice: Subject to any disclaimer, the term of this patent is extended or adjusted under 35 U.S.C. 154(b) by 0 days.

(21) Appl. No.: 18/239,487

(22) Filed: Aug. 29, 2023

Related U.S. Application Data (60) Provisional application No. 63/523,179, filed on Jun. 26, 2023.

(51) Int. Cl.
*H04L 9/40* (2022.01)

(52) U.S. Cl.
CPC ............ *H04L 63/20* (2013.01); *H04L 63/105* (2013.01)

(58) Field of Classification Search
CPC .............................. H04L 63/20; H04L 63/105
USPC ........................................................... 726/1
See application file for complete search history.

(56) References Cited

U.S. PATENT DOCUMENTS

| | | | | |
|---|---|---|---|---|
| 8,955,148 | B1* | 2/2015 | Biegala | H04L 63/10 726/27 |
| 10,089,187 | B1* | 10/2018 | Pecoraro | H04L 67/1097 |
| 11,150,816 | B2* | 10/2021 | Fritz | G06F 3/0647 |
| 11,606,395 | B2* | 3/2023 | Gavish | H04L 63/20 |
| 2015/0256526 | A1* | 9/2015 | Biegala | H04L 63/08 726/6 |
| 2019/0108225 | A1* | 4/2019 | Jayaram | G06F 16/245 |
| 2022/0179986 | A1* | 6/2022 | Veeramachaneni | G06F 3/0637 |
| 2022/0191251 | A1* | 6/2022 | Gavish | H04L 63/101 |
| 2023/0199030 | A1* | 6/2023 | Gavish | H04L 63/10 726/1 |

OTHER PUBLICATIONS

Securing the DaaS Environment, Sarkar, Jan. 2015 (Year: 2015).*

* cited by examiner

*Primary Examiner* — Jahangir Kabir
(74) *Attorney, Agent, or Firm* — Bryan Cave Leighton Paisner LLP (57) ABSTRACT

The present disclosure relates to techniques for remediating data assets stored on one more software as a service (SaaS) platforms from a centralized security enforcement platform. An integration component is configured to integrate SaaS accounts with the security enforcement platform. The security enforcement platform enables users to create remediation policies that target specified data assets stored on the SaaS accounts. In some scenarios, the automated remediation functions can be executed to perform bulk remediation on large-scale data assets while handling inheritance issues in full.

16 Claims, 7 Drawing Sheets

SYSTEMS AND METHODS FOR REMEDIATING ACCESS AND ENFORCING CYBERSECURITY POLICIES ACROSS SAAS PLATFORMS

CROSS-REFERENCE TO RELATED APPLICATIONS

This application claims benefit of, and priority to, U.S. Provisional Patent Application No. 63/523,179 filed on Jun. 26, 2023. The contents of the aforementioned application is herein incorporated by reference in its entirety.

TECHNICAL FIELD

This disclosure is related to improved network and cloud-based security techniques for tracking data assets across SaaS platforms, and performing remediation of those data assets over a network. In certain embodiments, a centralized, security enforcement platform can be configured to remotely monitor the data assets stored on SaaS platforms over a network, and execute bulk remediation functions on large-scale data assets.

BACKGROUND

Software as a service (SaaS) platforms are utilized by organizations and individuals for a variety of purposes, such as to share files, collaborate on projects, generate documents, etc. The security features offered by SaaS platforms vary across platforms and tend to be implemented using different protocols. Due to the inconsistent nature of the security features provided across the various SaaS platforms, no uniform or centralized solution exists to monitor and enforce security policies on data assets stored across multiple SaaS platforms.

Using SaaS platforms can present various security risks. Amongst other things, security risks can arise when files stored on the SaaS accounts have excessive access permissions and/or when the access permissions are not updated in a timely fashion. For example, an organization user may initially wish to provide one or more third-party collaborators with certain access permissions for data assets stored on a SaaS platform (e.g., in connection with certain projects and/or performing due diligence), but may later wish to revoke some or all of those access permissions at a later point time. Failure to revoke the permissions in a timely fashion can lead to a variety of security concerns.

In some exemplary scenarios, a single organization may store bulk quantities (e.g., 100,000, 500,000, or more) of data assets on a given SaaS platform or across multiple SaaS platforms. The task of tracking and remediating permissions across these assets can be technically challenging, especially in scenarios where the assets are spread across multiple SaaS platforms. Additionally, an organization may have many users, and each user may utilize accounts on multiple SaaS platforms. Ensuring the protection of data assets spread across multiple SaaS platforms and multiple user accounts can be extremely difficult in these scenarios.

Typically, tracking and remediating permissions requires an administrative user to manually review and change the permissions for each individual data asset directly through the SaaS platform where the data assets are stored. This extensiveness of this task is compounded in scenarios where the data assets are stored across multiple SaaS platforms and/or the organization has many users, each having separate SaaS accounts. The manual process of reviewing and remediating access permissions is extremely time-consuming, and can take several weeks, or even months, in many instances. Additionally, this process is susceptible to human error (e.g., in scenarios where the user fails to identify an asset with excessive permissions or improperly designates permissions during remediation). This weakens the organization's overall cybersecurity posture, exposes the organization's assets to vulnerabilities, and introduces substantial risk to the organization on multiple fronts.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

The present disclosure relates to systems, methods, apparatuses, and techniques for remediating permissions to data assets stored on one or more software as a service (SaaS) platforms. In certain embodiments, a security enforcement platform (or security control platform) operates as a centralized controller that is in communication with SaaS platforms over a network, and transmits commands over the network to modify or change permissions to data assets stored on the SaaS platforms. The automated remediation functions described herein can facilitate bulk remediation of data assets stored on large scales, eliminate vulnerabilities of exposed data, and improve the overall cybersecurity posture of the organization.

In certain embodiments, the security enforcement platform can include an integration component that links or integrates accounts on SaaS platforms with the security enforcement platform. The integration component allows for bi-direction communication between the SaaS platforms and the security enforcement platform for enforcing security protocols on the linked SaaS accounts. The security enforcement platform can receive various activity events generated by the SaaS accounts integrated with the security enforcement platform, including events that identify or modify access permissions of the data assets stored on the SaaS accounts. Amongst other things, the activity events enable the security enforcement platform to continuously monitor changes or modifications to the permissions associated with the data assets stored on the SaaS platforms.

Additionally, the security enforcement platform can maintain a database that tracks and stores the current set of access permissions associated with each data asset, along with a file system storage hierarchy that identifies how those data assets are arranged or nested among various directories and storage drives. This database provides the security enforcement platform with up-to-date statuses of the access permissions for the data assets spread across multiple SaaS platforms and/or multiple SaaS accounts.

The security enforcement platform also can enable security teams, administrative users, and/or other individuals to generate remediation policies that can be executed to modify or remediate the permissions assigned to the data assets stored on the SaaS platforms and/or SaaS accounts. Various filters can be utilized to target a subset of data assets for remediation. Prior to enforcing a remediation policy, the user may be presented with a preliminary assessment report that provides a summary of the targeted data assets and proposed remediation policy. Upon receiving confirmation or approval of the assessment report, the security enforcement platform can transmit commands over the network to one or more SaaS platforms (or corresponding SaaS accounts) to remediate the targeted data assets.

The security enforcement platform can execute the remediation policies in a manner that overcomes challenges related to permission inheritance, such as where one or more assets targeted by a given remediation policy have permissions that are inherited from parent directories and/or parent drives. Prior to executing a remediation policy, the preliminary assessment for the remediation policy can identify any targeted data assets that inherit permissions from a parent drive or directory, as well as collateral data assets whose permissions would be affected if the permissions of the parent directory or drive were changed. This information can be extracted from an analysis of the database that stores the data asset permissions and file system storage hierarchy, and can be presented to a user in the preliminary assessment report prior to executing the remediation policy. The preliminary assessment report can include options that enable users to choose how the permission inherency issues should be resolved when the remediation policy is executed.

While certain portions of this disclosure may describe applications or examples of cybersecurity technologies in the context of SaaS platforms, it should be recognized that these technologies also can be applied to any type of software solution, application, program, and/or platform. For example, in certain embodiments, the security enforcement platform can alternatively, or additionally, be configured to communicate with and enforce control policies on other types of software applications and programs (e.g., applications installed locally on computing devices and/or other web-based software applications).

As evidenced by the disclosure herein, the inventive techniques set forth in this disclosure are rooted in computer technologies that overcome existing problems in known security and networking systems, including problems associated with remediating remotely hosted data assets on large scale. The technologies described in this disclosure provide a technical solution for overcoming the aforementioned limitations (as well as other limitations) associated with known techniques, such as those requiring manual review and modification of data assets permissions across various SaaS platforms. In some examples, the cybersecurity technologies described in this disclosure may utilize improved networking techniques to integrate SaaS platforms (and/or other types of software solutions) with a centralized security enforcement platform, thereby enabling the centralized security enforcement to dynamically monitor permissions and storage hierarchies of data assets remotely stored on SaaS platforms. This knowledge can then be leveraged by the security enforcement platform to automate remediation of the data assets while addressing inheritance issues in full. Moreover, these technologies permit the security enforcement platform to enforce remediation policies on third-party platforms in a uniform manner, despite the inconsistent nature in which various SaaS platforms manage and facilitate access to the data assets. This technology-based solution marks an improvement over existing capabilities and functionalities related to cybersecurity systems by enabling enforcement of remediation policies on bulk assets using a centralized control system.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1A:
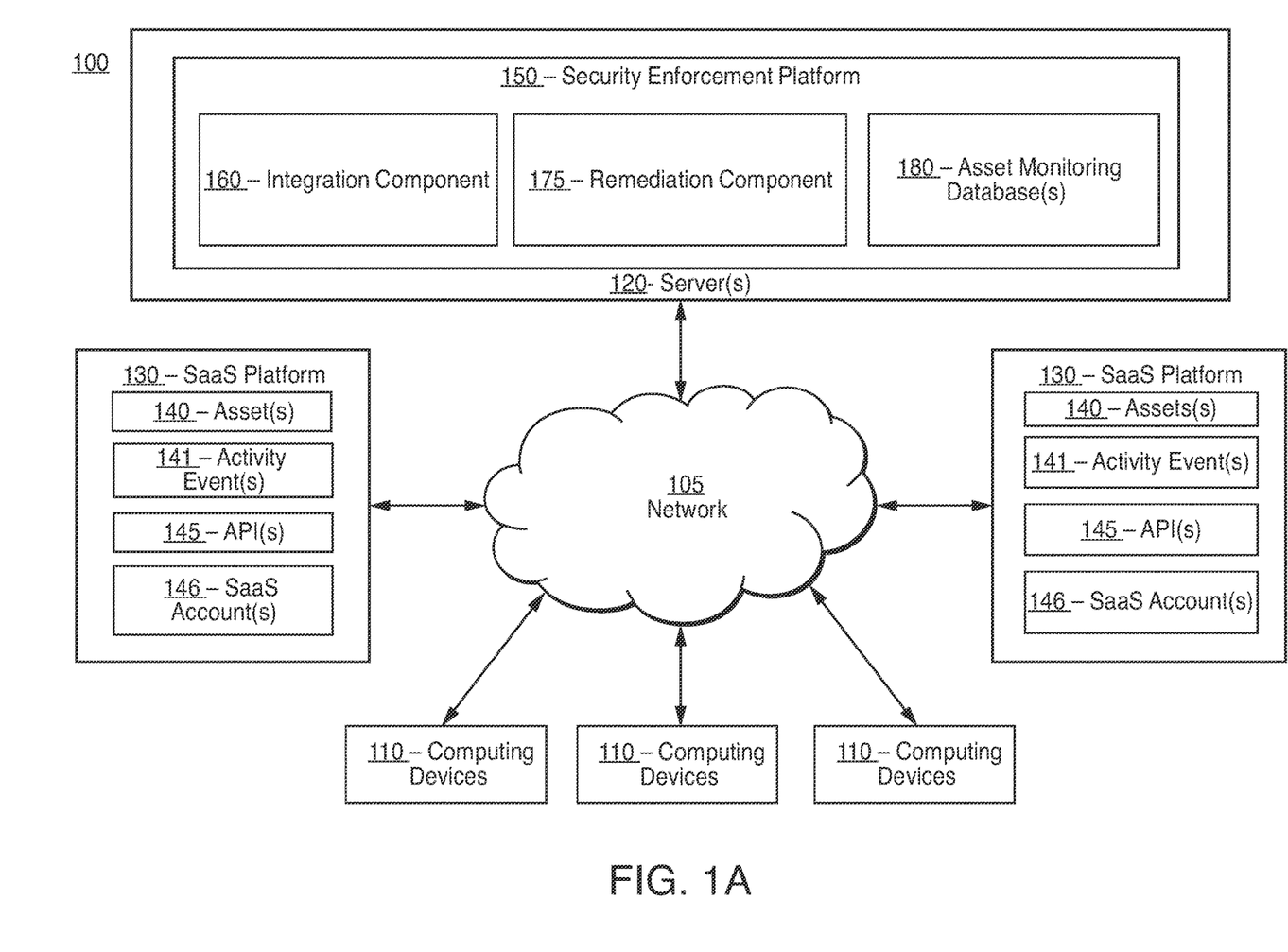
FIG. 1A is a block diagram of an exemplary system for remediating access to data assets stored on SaaS platforms in accordance with certain embodiments.
Figure 1B:
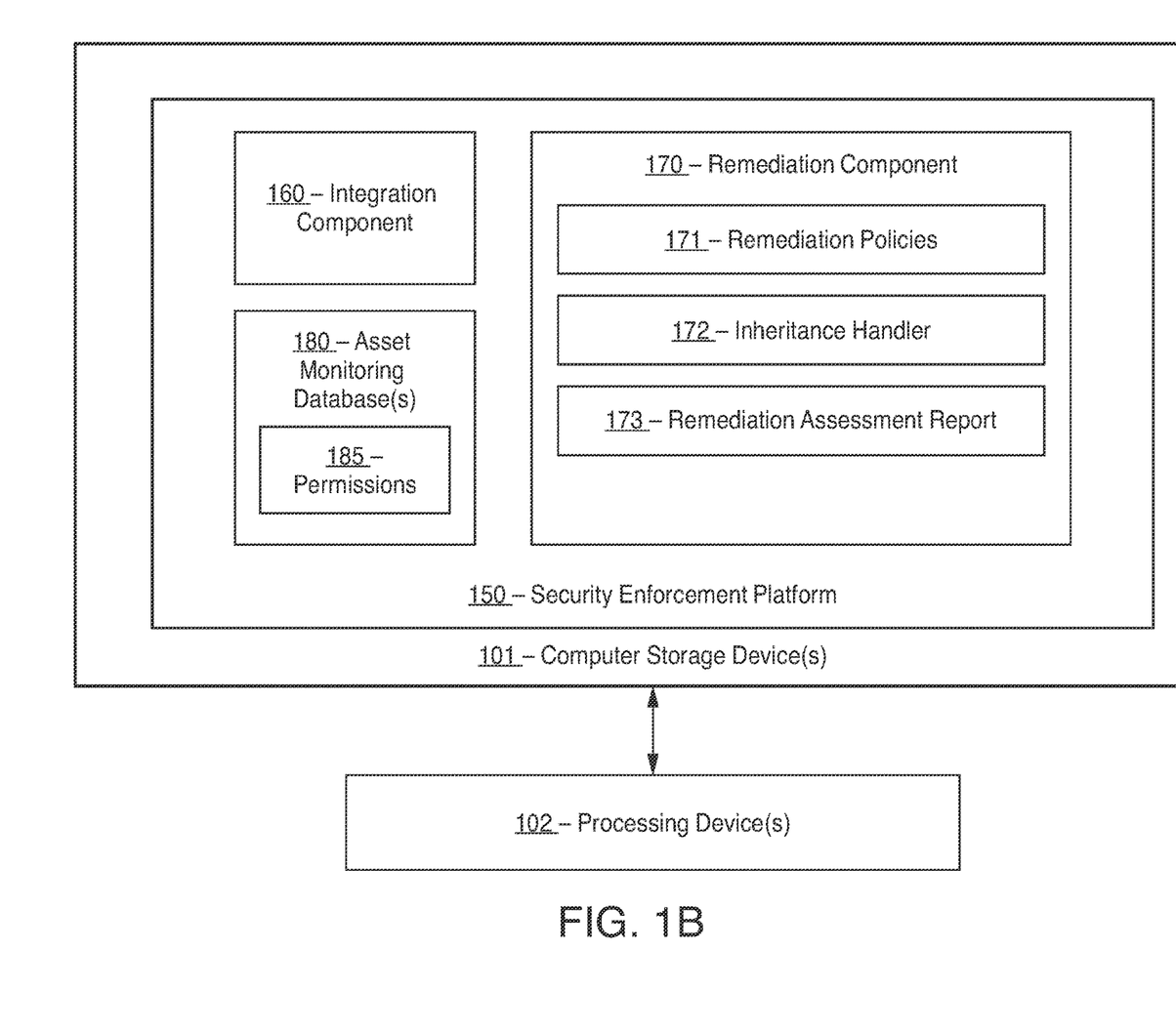
FIG. 1B is a block diagram disclosing an exemplary configuration of a security enforcement platform in accordance with certain embodiments.

FIG. 1A is a block diagram of an exemplary system 100 in accordance with certain embodiments. FIG. 1B is a block diagram disclosing an exemplary configuration of a security enforcement platform 150 (also referred to as a "security control platform" herein) in accordance with certain embodiments.

In certain embodiments, the system 100 comprises one or more computing devices 110, one or more servers 120, and one or more SaaS platforms 130 that are in communication over a network 105. A security enforcement platform 150 is stored on, and executed by, the one or more servers 120. The network 105 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. The system 100 may include any number of computing devices 110, servers 120, SaaS platforms 130, and/or security enforcement platforms 150.

All the components illustrated in FIG. 1A, including the computing devices 110, servers 120, SaaS platforms 130, and security enforcement platform 150, can be configured to communicate directly with each other and/or over the network 105 via wired or wireless communication links, or a combination of the two. Each of the computing devices 110, servers 120, SaaS platforms 130, and security enforcement platform 150 can also be equipped with one or more transceiver devices, one or more computer storage devices 101 (e.g., RAM, ROM, PROM, SRAM, etc.), and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more computer storage devices 101 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices 101 can be physical, non-transitory mediums.

In certain embodiments, the computing devices 110 may represent desktop computers, laptop computers, mobile devices (e.g., smart phones, personal digital assistants, tablet devices, vehicular computing devices, wearable devices, and/or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110, SaaS platforms 130, and/or other applications and devices over the network 105 (e.g., over the Internet).

In certain embodiments, each SaaS platform 130 may host one or more applications that are made available to users over the network 105. In some cases, the applications offered by the SaaS platform 130 may represent web-based applications. Each SaaS platform 130 may be hosted on one or more servers (e.g., which may be the same or similar to server 120 described herein). Each SaaS platform 130 may offer separate SaaS accounts 146 to users (e.g., which may correspond to individuals, organizations, corporations, businesses, and/or other entities). In certain embodiments, in response to a user creating a SaaS account 146 on a SaaS platform 130, the SaaS platform 130 may create a separate instance of one or more applications offered by the platform and the separate instance may be associated with the account. In some cases, each of the one or more of the SaaS platforms 130 may permit users to upload, create, edit, and/or share assets 140 with other users. For example, each SaaS platform 130 may permit a user to share one or more assets 140 with internal users (e.g., employees within that user's organization) and/or external users (e.g., third parties such as vendors, collaborators, and customers).

The services and functions provided by each SaaS platform 130 can vary. In some examples, the SaaS platforms 130 may provide file storage services, social networking services, e-mail services, document processing services, data hosting services, enterprise business services, project collaboration services, and many other types of services. Exemplary providers of the SaaS platforms 130 may include products and/or services such as Slack®, Zoom®, Facebook®, Google Workspace®, DocuSign®, Dropbox®, Trello®, ClickUp®, Vimeo®, Amazon Web Services®, Data Dog®, Net Suite®, Twillo®, Splunk®, WebEx®, Zenefits®, Pipedrive®, Box®, Now®, and many others.

As mentioned above, some or all of the SaaS platforms 130 may provide functions that permit assets 140 associated with a user's account to be shared with various third parties. For example, some SaaS platforms 130 (e.g., such as Dropbox®) may permit a user to create an account that includes functions for storing files and sharing assets 140 with other users. Similarly, some SaaS platforms 130 (e.g., such a Slack®) may permit users to collaborate on shared assets 140, and/or may include functions for creating, editing, and/or deleting the assets 140. In some scenarios, the assets 140 shared using the SaaS platforms 130 may be accessed over the network 105 by other users and/or may be made publicly available on the network 105.

The types of assets 140 (also referred to herein as "data assets") included on, or accessed by, the SaaS platforms 130 can vary greatly. Generally, the assets 140 may relate to any type of digital content and may include any file type. For example, assets 140 may include word processing documents, images, source code files, audio files, video files, database files, spreadsheets, portable document format (PDF) files, programs, applications, folders, directories, drives, and many other types of files or containers that include files. In some cases, the users may import and/or upload the assets 140 to the SaaS platforms 130. Additionally, some of the SaaS platforms 130 may permit users to create new assets 140 and/or edit the assets 140. As mentioned above, each of the SaaS platforms 130 also may provide functions that enable users to share the assets 140 and/or designate permissions for the assets 140.

Each asset 140 stored on, or made available via, a SaaS account 146 may be associated with permissions 185. The permissions 185 associated with an asset 140 may include file permissions, such as those prohibiting or permitting users to read, write, modify, delete, download, move, export, and/or execute the assets 140. For each asset 140, these file permissions may be designated for different categories of users (e.g., owner, group, and/or others). The permissions 185 associated with an asset 140 also may include sharing privileges, which may indicate whether the asset 140 is public or private, and/or whether full or limited access to the asset 140 was granted to certain users. The permissions 185 or other data associated with the an asset 140 also may specify an owner property, which identifies the user that has primary control over the asset 140 and allows the user to control privileges, permissions, access rights, and/or other aspects of the asset 140.

For various reasons, the permissions associated with the assets 140 stored on the SaaS platforms 130 may be improper or provide excessive access rights, which can lead to serious security risks and vulnerabilities. In some scenarios, the permissions may be changed or modified to provide temporary access to internal organization users and/or external third parties. For example, a SaaS account user may wish to temporarily share one or more assets 140 with third parties for a limited duration of time (e.g., to collaborate on a project or to provide information to potential customers), but the owner or user may forget to remove access to those assets 140 after that duration of time has expired. In other scenarios, certain internal users may be given access to read and modify files while employed at an organization, but those permissions may not be revoked when those users subsequently leave the organization. In further scenarios, the permissions for one or more data assets 140 may be improperly designated from the outset when assets 140 are created and/or uploaded to SaaS account. In other scenarios, viruses, malware, or malicious users may intentionally change the permissions of data assets 140 to create vulnerabilities or provide unauthorized access to the assets 140.

As discussed above, traditional techniques for ensuring that each asset 140 on each SaaS platform 130 (and each SaaS account 146) has appropriate permissions involve extremely time-consuming and resource-intensive tasks, which typically require a manual review of the asset permissions on each SaaS platform 130 and/or corresponding SaaS accounts 146 on each SaaS platform 130. This burden exponentially grows in scenarios where massive amounts of assets 140 (e.g., thousands or millions of assets 140) are stored across multiple SaaS platforms 130 and/or SaaS accounts 146.

As explained throughout this disclosure, the security enforcement platform 150 can be configured to monitor or track the permissions of data assets 140 allocated across various SaaS platforms 130 (and associated SaaS accounts 146), and to remediate improper or unauthorized permissions granted on the assets 140. In some examples, the security enforcement platform 150 can include a remediation component 170 that identifies assets 140 having improper or incorrect permissions, and transmits commands over the network 105 to the SaaS platforms 130 (or SaaS accounts 146) to change or modify the permissions of the assets 140. In scenarios where the SaaS platforms 130, or SaaS accounts 146 included thereon, store large quantities of assets (e.g., 10,0000+, 100,000+, 500,000+ or more), the automated remediation functions executed by remediation component 170 can facilitate bulk remediation across these large-scale assets. Examples of how of the security enforcement platform 150 performs these and other related functions are described in further detail below.

In certain embodiments, the security enforcement platform 150 is stored on, and executed by, the one or more servers 120. For example, in some cases, the security enforcement platform 150 itself can represent a SaaS platform and/or cloud-based application that runs on the one or more servers 120. Additionally, or alternatively, the security enforcement platform 150 may be implemented as a local application that is stored on, and executed by, one or more computing devices 110. Regardless of its implementation, an organization or user can create an account with the security enforcement platform 150 to control and manage the security of data assets 140 stored across various SaaS platforms 130 and/or SaaS accounts 146.

In certain embodiments, the security enforcement platform 150 includes an integration component 160 that links and/or integrates SaaS accounts 146 on SaaS platforms 130 with the security enforcement platform 150. For example, upon accessing an account on the security enforcement platform 150, the integration component 160 may permit a user to identify SaaS accounts 146 on one or more SaaS platforms 130 to be linked to the security enforcement platform 150 (e.g., such as SaaS accounts 146 associated with an organization and/or employees of an organization). For each identified SaaS account 146, an authorization framework may enable the integration component 160 to securely access some or all of the data (including the assets 140) associated with the SaaS account 146. In certain embodiments, the integration component 160 may communicate with one or more application programming interfaces (APIs) provided by the SaaS platforms 130 to integrate the SaaS accounts 146 with the security enforcement platform 150 and to access data associated with the SaaS accounts 146.

In certain embodiments, the integration component 160 can utilize OAuth 2.0 and/or other types of authorization frameworks to integrate SaaS accounts 146 and access data associated with the SaaS accounts 146. Upon linking or integrating a SaaS account 146 with the security enforcement platform 150, the integration component 160 allows for bi-directional communication between the SaaS platforms 130 and the security enforcement platform 150.

After a SaaS account 146 is linked to, or integrated with, the security enforcement platform 150, the security enforcement platform 150 can monitor and/or track the data assets 140 associated with the SaaS account 146 and activities associated with the SaaS account 146. In some examples, the security enforcement platform 150 can receive activity events 141 from the SaaS accounts 146 that pertain to changing or modifying asset permissions, sharing assets 140, authenticating users, installing plugins, manipulating assets 140, changing user roles or account information, changing account passwords, and/or other related features and functions that can affect the security of the SaaS account 146 or data associated with the SaaS account 146.

Various types of activity events 141 can be received and analyzed by the security enforcement platform 150. The activity events 141 can generally indicate any type of activity that is conducted on the SaaS accounts 146. Exemplary activity events 141 can include, inter alia, share events, file events, and/or user events.

Share events can include any activity event associated with sharing assets and/or other data using a SaaS account 146. For example, share events may indicate that a SaaS account 146 is sharing an asset 140 and/or attempting to share an asset 140. Share events also may be generated which indicate that a user with whom an asset 140 has been shared is attempting to access, view, create, edit, and/or delete the shared asset 140.

File events can include any activity event 141 associated with manipulating assets 140 using a SaaS account 146. Exemplary file events can generated in response to any or all of the following: changing or modifying permissions of assets; changing ownership properties of data assets; copying and/or pasting files, folders, drives, directories, and/or other data assets; creating, editing, and/or deleting data assets; renaming data assets; uploading data assets to SaaS accounts; downloading data assets from SaaS accounts; and/or moving or changing locations of data assets.

User events can include any activity event 141 associated with manipulating details of a SaaS account 146, designating privileges of a SaaS account 146, and/or manipulating user groups associated with a SaaS account 146. Exemplary user events can be generated in response to any or all of the following: changing user roles associated with SaaS accounts (e.g., designating administrator roles to user accounts); creating, editing, and/or deleting user groups; approving or denying user requests; changing passwords associated with SaaS accounts; changing contact information associated with SaaS accounts; adding and/or removing users from user groups or teams; and/or changing user statuses (e.g., invited, joined, suspended, terminated, etc.).

Many other types of activity events 141 can be generated by the SaaS accounts 146. For example, activity events 141 also may indicate that a plugin has been installed and/or that a plugin is attempting to access assets 140 and/or other content associated with a SaaS account 146. Activity events 141 also may indicate whether or not a user utilized one or more authentication protocols (e.g., MFA or multi-factor authentication) to access a SaaS account 146 and/or asset 140 associated with a SaaS account 146. Activity events 141 also may indicate that a user is attempting to install or uninstall a script, add-on, application, and/or other software that interacts with a SaaS account 146.

Each activity event 141 may include metadata that provides information related to the action or attempted action being undertaken by a corresponding SaaS account 146. In one example, one or more activity events 141 may be generated when the permissions 185 and/or ownership of data asset is modified. In this scenario, the one or more activity events 141 may include metadata that identifies the data asset 140, the original permissions or ownership properties associated with the data asset 140, the modified permissions or ownership properties, and the SaaS account where the data asset is located. In another example, one or more activity events 141 may be generated when a data asset 140 is moved to a new location (e.g., directories or drives), and the metadata may identify the data asset 140, the original location of the data asset 140, the new location of the data asset 140, and the SaaS account where the data asset is located.

In a further example, in response to a user attempting to share an asset 140 via a SaaS account 146, an activity event 141 (e.g., a share event 142) may be generated that includes metadata identifying the SaaS account 146 and/or user attempting to share the asset 140, an identifier indicating or identifying the asset 140 attempting to be shared, access privileges associated with sharing the asset 140 (e.g., indicating whether public vs. limited user access was specified and/or whether an expiry date has been specified for accessing the file), a timestamp indicating when the event was created, and/or one or more intended recipients of the asset 140. Similarly, after an asset 140 has been shared, subsequent activity events 141 may be generated in response to recipient users accessing, viewing, editing, and/or deleting the shared asset 140. Each activity event 141 may include corresponding metadata (e.g., identifying the recipient user who is attempting to access the asset 140, indicating the type of activity being attempted, and a timestamp associated indicating when the event was initiated).

All activity events 141 (and corresponding metadata) associated with the assets 140 being shared may be received by the security enforcement platform 150. In certain embodiments, web hooks provided by, or accessible through, each of the SaaS platforms can be configured to automatically transmit the activity events 141 to the security enforcement platform 150. Additionally, or alternatively, the security enforcement platform 150 may periodically poll the APIs 145 of the SaaS platforms 130 and/or SaaS accounts 146 to pull and retrieve the activity events 141. Regardless of how the activity events 141 and corresponding metadata are provided to the security enforcement platform 150, the activity events 141 and corresponding metadata may be analyzed by the security enforcement platform 150 (e.g., the remediation component 170) to track permissions associated with the data assets 140 and/or to remediate access to the data assets 140 in various scenarios (e.g., such as when improper access or excessive permissions are granted to the data assets 140).

The security enforcement platform 150 can store, maintain, and/or update an asset monitoring database 180 that monitors or tracks the permissions 185 associated with data assets 140 stored on each SaaS platform 130 and/or each SaaS account 146. As mentioned above, the permissions 185 for each asset 140 may specify file permissions (e.g., indicating categories of users that can read, write, modify, edit, and/or delete files) and sharing permissions (e.g., indicating whether the file is private, publicly shared, and/or accessible to a limited set of users) associated with asset 140, and may identify permissions an owner of the asset 140. The asset monitoring database 180 can be configured to continuously monitor the permissions 185 associated with each asset 140 stored across the various SaaS platforms 130 and/or SaaS accounts 146, and can be updated to reflect changes or modifications to the permissions 185.

In some cases, the permissions 185 for certain data assets stored in the asset monitoring database 180 may initially be identified when a SaaS account 146 is integrated with the security enforcement platform 150 (e.g., using the integration component 160). Thereafter, changes or modifications to the permissions 185 may be identified by monitoring activity events 141 generated by the SaaS accounts 146. For example, activity events 141 may be generated in response to sharing assets 140 via a SaaS account and/or in response to modifying asset permissions. These activity events 141 can be transmitted over the network 105 from a SaaS platform 130 to the security enforcement platform 150, and the security enforcement platform 150 may update the permissions 185 in the asset monitoring database 180 based on detected changes.

In addition to storing the permissions 185 associated with each asset 140, the asset monitoring database 180 also can store a file system hierarchy that defines the organization and structure of the data assets 140 (e.g., files and directories) based on the manner in which they are stored on the SaaS platforms 130. Amongst other things, the file system hierarchy defines how files, directories, and/or other data assets are arranged and nested, and creates a hierarchical structure that allows for efficient storage and retrieval of data.

In some embodiments, the asset monitoring database 180 may represent a single database that is specifically designed to store and/or track the permissions 185 associated with the assets 140. Additionally, or alternatively, the asset monitoring database 180 may comprise multiple databases and/or may store a variety of other information relating to the data assets 140, SaaS accounts 146, system users, etc. In the latter scenario, the permissions 185 may be one data point stored among many other data points that are extracted to perform the functions described herein.

The remediation component 170 of the security enforcement platform 150 enables users to generate remediation policies 171 configured to remediate permissions 185 of data assets 140 stored on one or more SaaS platforms 130 and/or one or more SaaS accounts 146. In certain embodiments, users can access one or more graphical user interfaces (GUIs) via the security enforcement platform 150 and/or remediation component 170 to define and customize the specific remediation policies 171. For example, a user defining a remediation policy 171 can select various filters to identify a specific subset of data assets 140 to remediated (e.g., such as filters that identify assets 140 stored in specific drives or directories, assets 140 owned by specific users, and/or to assets 140 having particular types of permissions 185). The user also can specify a set of target permissions 185 that are to be applied to the assets 140 identified by the filters.

Figure 2A:
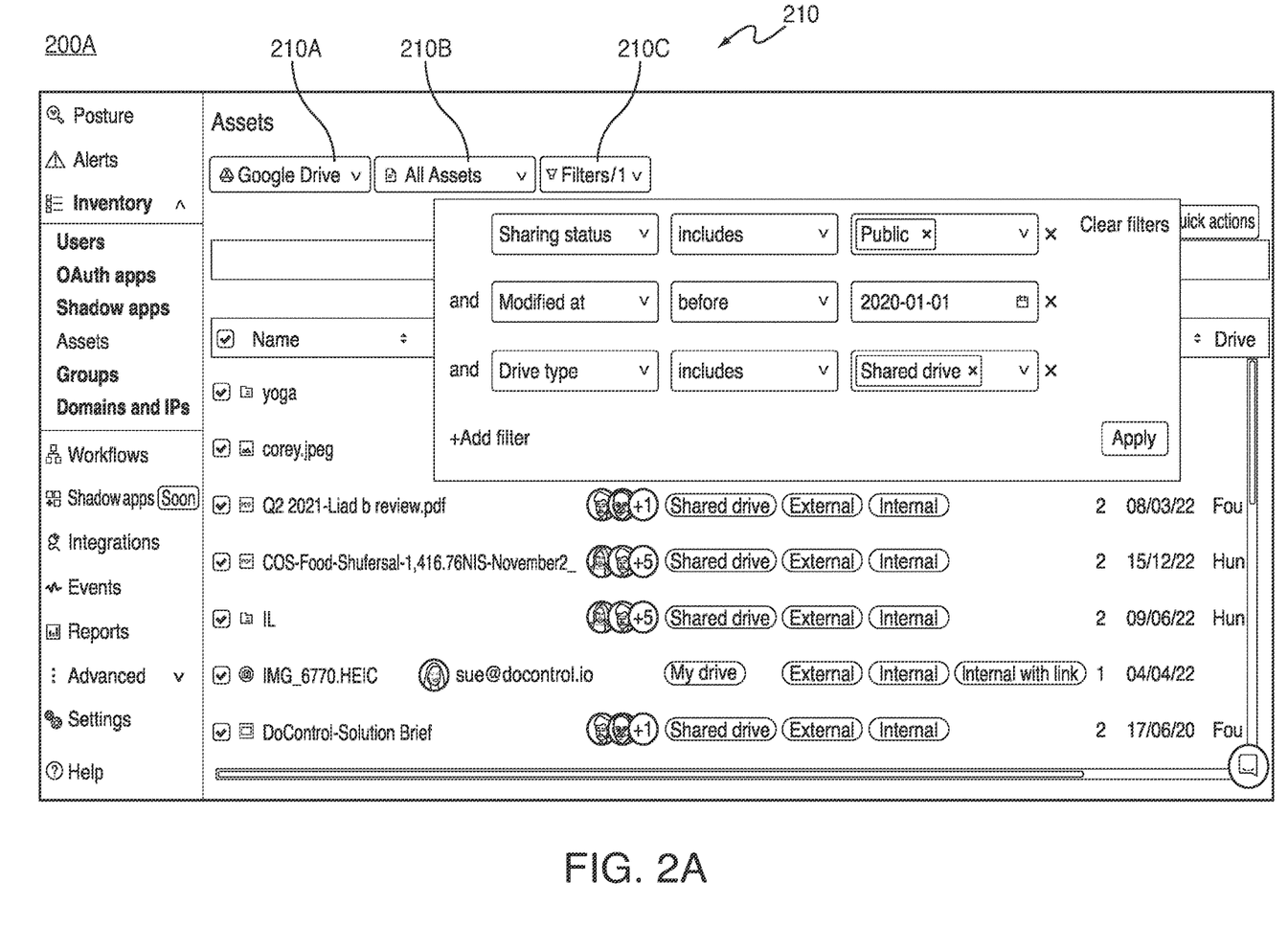
FIG. 2A is an exemplary interface provided via the security enforcement platform in accordance with certain embodiments.

FIG. 2A is an exemplary graphical user interface 200A that demonstrates exemplary filters 210 that can be applied to define a remediation policy 171 according to certain embodiments. These filters 210 can be utilized to identify a subset of assets 140 stored on one or more SaaS platforms 130. The assets 140 satisfying the filtering criteria will be targeted for remediation when the remediation policy 171 is finalized and executed. In this example, the interface 200A includes a SaaS provider filter 210A, a drive filter 210B (or directory filter 210B), and an attribute filter 210C. Other types of filters 210 also may be utilized to identify target assets 140 for the remediation policy 171.

The SaaS provider filter 210A enables selection of one or more SaaS platforms 130 that have been integrated with the user account that is accessing interface 200A. For example, an account on the security enforcement platform 150 can be integrated with multiple SaaS accounts 146 provided by multiple SaaS platforms 130 (e.g., such as Google Drive®, DropBox®, Slack®, etc.), and each of the SaaS platforms 130 may store various data assets 140. The SaaS provider filter 210A can be utilized to identify a target SaaS platform 130 (or multiple SaaS platforms 130) for the remediation policy 171 being defined.

The drive or directory filter 210B enables selection of specific drives or directories included on the SaaS platform(s) 130 identified by the SaaS provider filter 210A. For example, each SaaS platform 130 may include a hierarchy of directories, and the filter 210B enables selection of specific directories to be targeted for the remediation policy 171 being defined. This hierarchy may be extracted from the asset monitoring database 180.

The attribute filter 210C enables selection of specific data assets 140 having certain attributes (e.g., on the targeted SaaS platform 130 and within the targeted directories). Various types of attributes can be specified to target specific data assets 140. For example, the attribute filter 210C can enable the user to identify data assets 140 having certain sharing permissions (e.g., public permissions or permissions that allow for sharing with external users) and/or being stored on certain types of drives (e.g., shared drives vs. private drives). The attribute filter 210C can allow for filtering on many other types of attributes, such as those indicating the file owner, date modified, date created, file name, file type, specific SaaS account(s), etc.

Returning to FIGS. 1A-1B, the interfaces for defining the remediation policy 171 also may enable the user to specify the types of remediation actions that should be performed. In some examples, the interface may include a listing of various remediation actions and the user can select one or more of the remediation actions to be performed on the data assets 140 identified by the filters. Exemplary remediation actions can include modifying any file permissions, sharing permissions, and/or ownership properties associated with the targeted data assets. For example, in some scenarios, a remediation action can include one or more of: removing, modifying, and/or adding sharing permissions for targeted data assets 140 (e.g., sharing permissions indicating whether files are private, public, and/or accessible by particular subsets of internal or external users); changing read, write, and/or execute permissions of targeted data assets 140; and/or changing file ownership properties of targeted data assets 140. Other types of remediation actions can be specified.

Figure 2B:
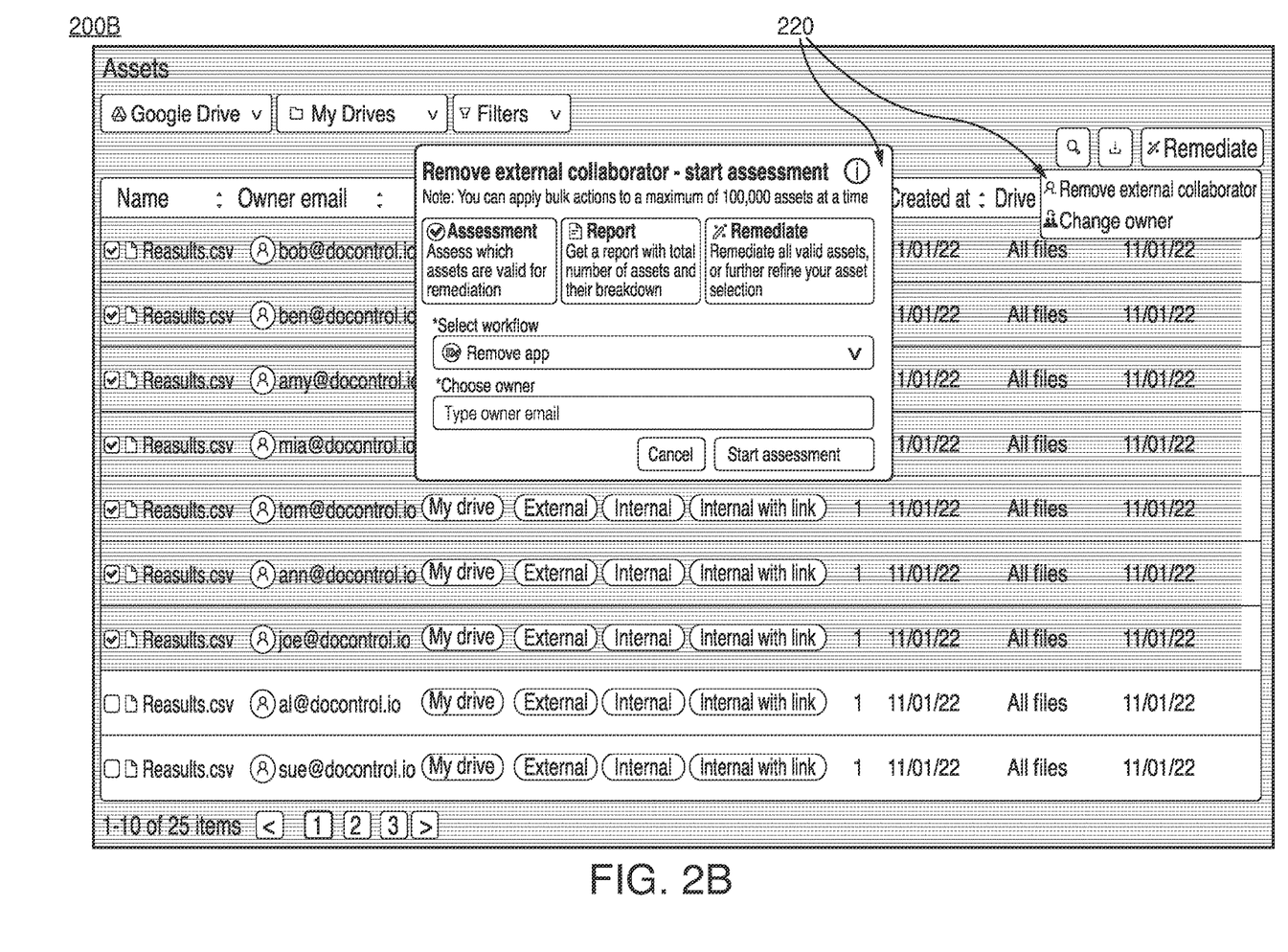
FIG. 2B is an exemplary interface provided via the security enforcement platform in accordance with certain embodiments.

FIG. 2B is an exemplary graphical user interface 200B that enables a remediation action 220 to be specified for a remediation policy 171 according to certain embodiments. In this example, the user is able to select a remediation action 220 that removes sharing privileges for third-party collaborators and/or which changes the ownership property of data assets 140. Many other types of remediation actions 220 also may be provided in other examples.

Returning to FIGS. 1A-1B, after the filters and remediation action applicable to a remediation policy 171 are defined by the user, the asset monitoring database 180 can be analyzed to identify the assets 140 that are subject to the remediation policy 171 based on the specified remediation policy 171. The remediation component 170 can then communicate over the network 105 with the SaaS platforms 130 and/or SaaS accounts 146 that store the assets 140 to remediate the assets subject to the remediation policy 171. For example, the remediation components 170 can send commands via an API 145 associated with the SaaS platforms 130 and/or SaaS accounts 146 to modify or change the permissions of the data assets 140 identified by the remediation policy 171. After the permissions 185 of the data assets 140 have been remediated, the SaaS platforms 130 and/or SaaS accounts 146 can transmit confirmations over the network 105 to the security enforcement platform 150. Additionally, the asset monitoring database 180 can be updated to reflect the modified permissions 185 of the assets 140.

One technical problem that can be encountered with remediating the data assets 140 can involve resolving issues related to inherited permissions. That is, in some cases, a data asset 140 (e.g., such a file or directory) may include permissions 185 that are set or defined by a parent directory or parent drive. In these scenarios, changing the permissions 185 of an asset 140 targeted by a remediation policy 171 may need to be performed by changing the permissions of a parent directory or drive. However, doing so may cause the permissions of other assets 140 included within the parent directory or drive to change as well (even though those other assets 140 are not applicable to the remediation policy 171). It can be useful to understand whether the user wishes to change the permissions of these collateral assets even though they are not subject to the remediation policy 171.

To address this challenge, the remediation component 170 can include an inheritance handler 172 that is configured to resolve issues related to inherited permissions. The inheritance handler 172 can be configured to determine whether each of the assets 140 subject to a specified remediation policy 171 has inherited permissions. For each such asset 140 having inherited permissions, the inheritance handler 172 may further identify additional or collateral assets (which are not necessarily subject to the remediation policy 171) that will be affected by the changing the permissions 185 of the asset 140. The inheritance handler 172 can make the aforementioned determinations, at least in part, using the file system hierarchy and associated permissions stored in the asset monitoring database 180. Understanding this information can permit the user who defined the remediation policy 171 to choose whether or not remediate the assets 140 having inherited permissions.

In some cases, the remediation component 170 and/or inheritance handler 172 can allow the user who defined the remediation policy 171 to select how remediation should be handled in the scenario where inherited permissions are detected. For example, the user can be presented with configurable options that enable the assets 140 with inherited permissions to be remediated (along with the collateral assets in child directories that are not subject to the remediation policy 171) and/or options that exclude those assets 140 with inherited permission from remediation. In some cases, the user also may be presented with options that enables the user to further refine the remediation policy 171 in order to avoid inclusion of assets 140 that have inherited permissions.

In certain embodiments, the remediation component 170 may generate, and present a user with, a remediation assessment report 173 prior to executing the remediation policy 171. Amongst other things, the remediation assessment report 173 can provide a summary of data assets 140 that will be remediated when the remediation policy 171 is executed. If one or more of the assets 140 to be remediated include inherited permissions, the remediation assessment report 173 also may identify any collateral assets that will be affected by changing the permissions of the one or more assets 140 (e.g., collateral assets 140 that will be affected by changing the permissions of the parent directory or drive that includes the one or more assets 140). In this scenario, the remediation assessment report 173 may request the user specify how remediation of assets 140 with inherited permissions should be handled.

Figure 2C:
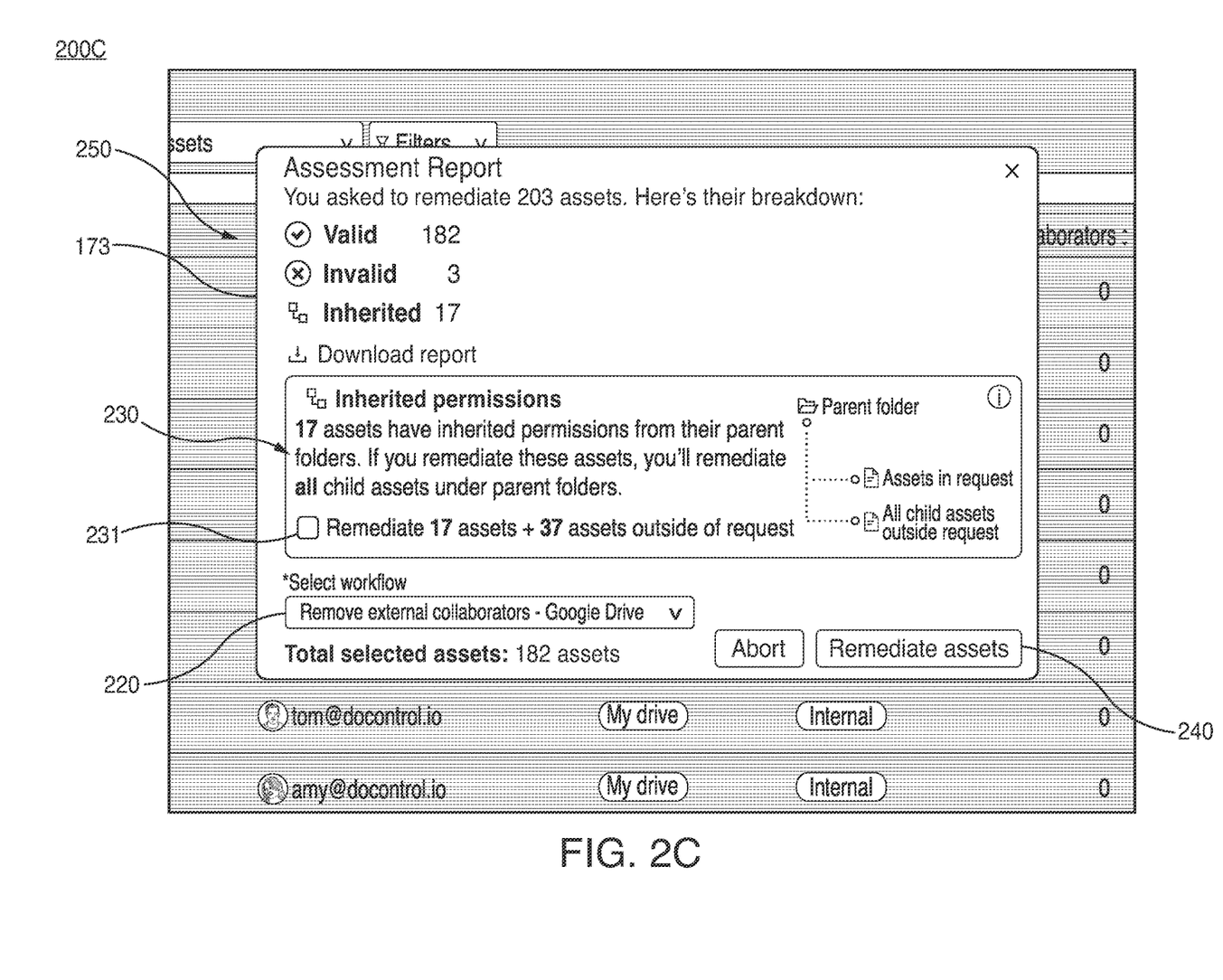
FIG. 2C is an exemplary interface provided via the security enforcement platform in accordance with certain embodiments.

FIG. 2C is a graphical user interface 200C that displays a remediation assessment report 173 according to certain embodiments.

The remediation assessment report 173 includes a summary section 250 identifying the number of data assets 140 that are: a) valid; b) invalid; and c) inherited. Data assets 140 designated as valid represent data assets 140 that will be remediated upon execution of the remediation policy 171. Data assets 140 designated as inherited represent the data assets 140 that include inherited permissions. Data assets 140 designated as invalid represent data assets 140 that were initially intended to be remediated, but will no longer be remediated due to changes that occurred while the remediation assessment report 173 was being created.

In some scenarios (e.g., such as when bulk quantities of data assets 140 are targeted for remediation), generating the remediation assessment report 173 may take several minutes or hours. During this time, the data assets 140 may be modified or deleted and, these modifications or deletions may exclude the data assets 140 from the scope of the remediation policy 171. In this scenario, these data assets 140 may be categorized as invalid in summary section 250.

The remediation assessment report 173 further includes an inheritance section 230 that enables a user to specify how inherited permissions should be resolved. The inheritance section 230 can identify the number of data assets 140 having inherited permissions, and the number of collateral assets 140 whose permissions will be changed if those data assets 140 with inherited permissions are modified by the remediation policy 171. The inheritance section 230 also includes a selectable or configurable option 231 that allows the user to specify whether to exclude the data assets 140 with inherited permissions from remediation or remediate the data assets with inherited permissions (along with the collateral assets).

The remediation assessment report 173 further displays the type of remediation action 220 that was selected by the user in connection with defining the remediation policy, as well as a policy execution option 240 that will initiate execution of the remediation policy 171 upon selection.

Returning to FIGS. 1A-1B, after a user confirms the details of the remediation assessment report 173, the remediation component 170 can execute the remediation policy 171. This can involve transmitting one or more commands over a network 105 to the SaaS platform 130 (or to multiple SaaS platforms 130) that store the data assets 140 in order to modify the permissions 185 of the data assets 140 subject to the remediation policy 171.

The manner in which the commands are transmitted over the network 105 to the SaaS platforms 130 can vary. In some cases, the remediation component 170 can iterate through the listing of data assets 140 to be remediated based on the remediation policy 171, and can sequentially transmit commands to the target SaaS platform(s) 130 to iteratively remediate the data assets 140. Additionally, or alternatively, parallel processing techniques can be executed to transmit the remediation commands in parallel. For example, in some cases, the SaaS platforms 130 (or associated APIs 145) allow for parallel processing of commands received by the security enforcement platform 150. The security enforcement platform 150 can store data indicating whether each SaaS platform 130 allows for parallel processing, and can leverage parallel processing of commands in scenarios when a remediation policy 171 targets a SaaS platform 130 having such functionality. Using parallel processing techniques to process the asset remediation commands can significantly reduce the time required to execute the remediation policy 171.

In some embodiments, the remediation component 170 can generate a GUI that enables a user to monitor and view the status of a remediation policy 171 while the policy is being executed or processed by the security enforcement platform 150. The time required to execute the remediation policy 171 can vary based on the quantity of data assets 140 that are targeted for remediation.

Figure 2D:
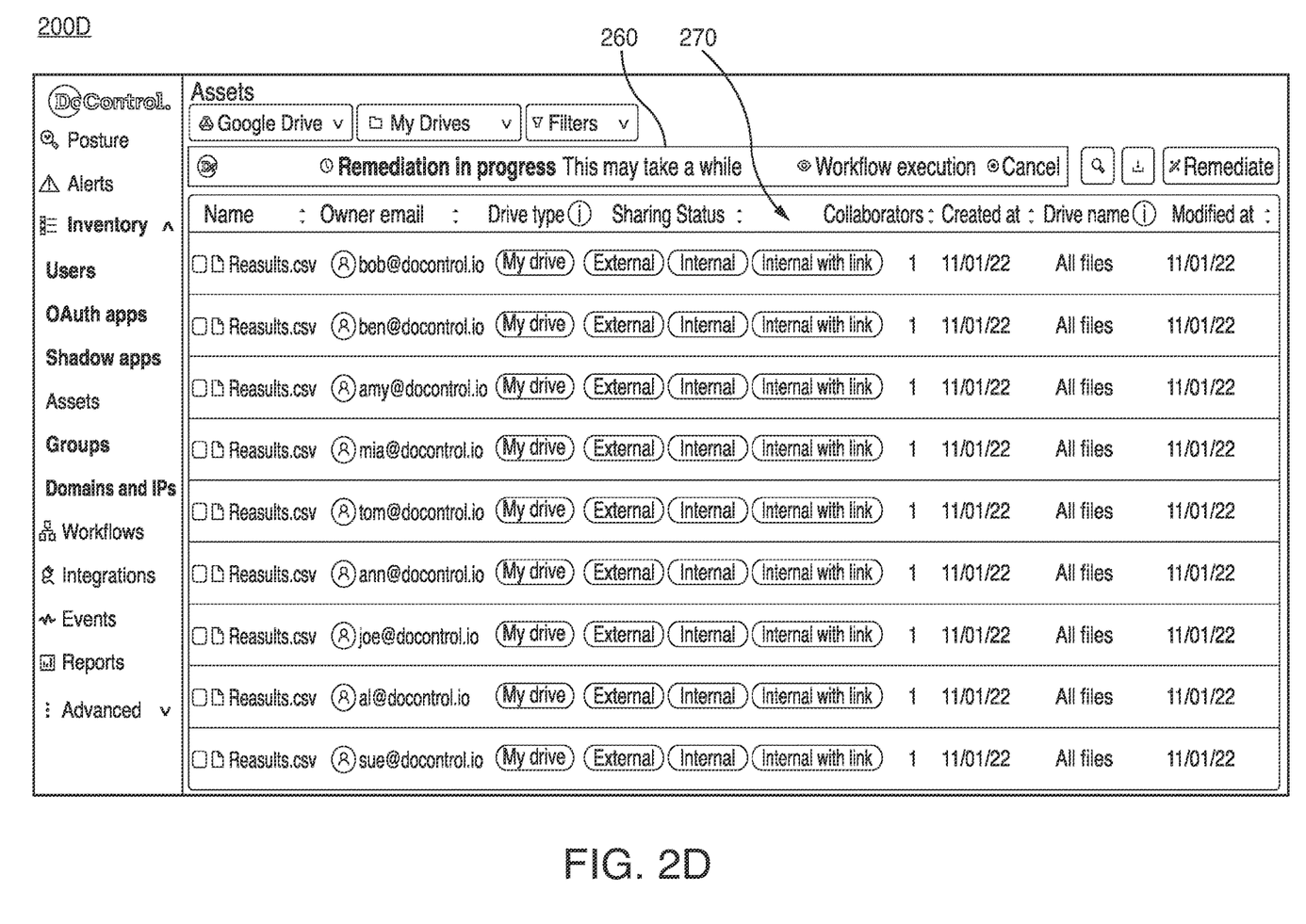
FIG. 2D is an exemplary interface provided via the security enforcement platform in accordance with certain embodiments.

FIG. 2D is an exemplary graphical user interface 200D that can be displayed by the security enforcement platform 150 while a remediation policy 171 is being executed according to certain embodiments. The interface 200D includes a progress bar 260 that displays the status of the remediation effort. Exemplary statuses may be updated accordingly to indicate that the remediation functions are in progress and/or have completed. In some cases, the progress bar 260 can show the percentage of targeted data assets 140 that have been remediated.

The interface 200D also displays a listing 270 of the targeted data assets 140. This listing may indicate the remediation status of each asset 140, such as indicating whether or not the asset 140 has yet been remediated and/or whether the asset 140 is currently undergoing remediation.

Figure 3:
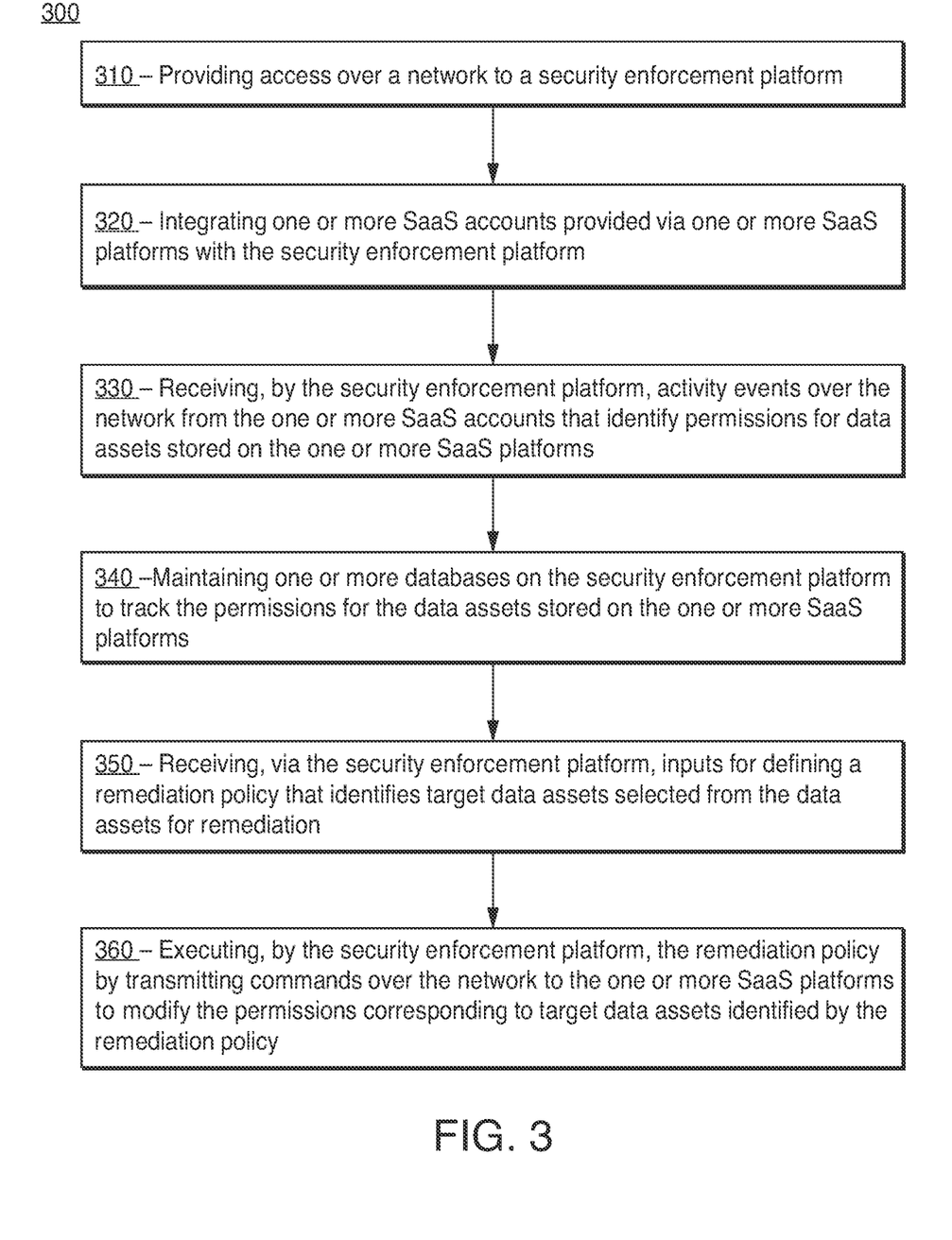
FIG. 3 is an exemplary method according to certain embodiments.

FIG. 3 is a flow diagram illustrating an exemplary method 300 according to certain embodiments. In certain embodiments, the security enforcement platform 150, the remediation component 170, the one or more computing devices 110, and/or the one or more servers 120 can include one or more computer storage devices 101 that store instructions for implementing the steps described in the method 300 and/or one or more processing devices 102 for executing the instructions. In some embodiments, the steps of the method 300 can be performed in the order presented. In other embodiments, the steps of method 300 can be performed in any suitable order. In still other embodiments, one or more of the steps of method 300 can be combined or skipped.

At step 310, access is provided to a security enforcement platform 150 (or security enforcement platform 150) over a network 105. A user can access the security enforcement platform 150 using a computing device 110. In some examples, the security enforcement platform 150 can be made available via a website or Internet address, and the computing device 110 can access the security enforcement platform 150 using a web browser. In other examples, the security enforcement platform 150 may be stored on a computing device 110 as a local or native application, and the security enforcement platform 150 can be accessed by launching the application on the computing device 110.

At step 320, one or more SaaS accounts 146 provided via one or more SaaS platforms 130 are integrated with the security enforcement platform 150. As explained above, the security enforcement platform 150 can include an integration component 160 that is capable of linking or integrating various SaaS accounts 146 with the security enforcement platform 150. In some examples, the integration component 160 can generate one or more GUIs that permit a user to identify SaaS accounts 146 on one or more SaaS platforms 130 to be linked to the security enforcement platform. In many scenarios, a user may provide login credentials (e.g., a username and password) for each SaaS account 146 to be linked. In certain embodiments, the integration component 160 can utilize OAuth 2.0, or a similar authorization framework, to link the SaaS accounts 146 to the security enforcement platform 150, and to provide the security enforcement platform 150 with access to various resources corresponding to the SaaS accounts 146.

At step 330, activity events 141 are received over the network 105 at the security enforcement platform 150 from the one or more SaaS accounts 146 that identify permissions 185 for data assets 140 stored on the one or more SaaS platforms 130. The activity events 141 can correspond to any type of activity that is conducted on the SaaS accounts 146. In some scenarios, the activity events 141 can correspond to share events, file events, and/or user events the security of the SaaS account 146 or data associated with the SaaS account 146. In some examples, the activity events 141 can include events that are generated in response to changing or modifying asset permissions on linked SaaS accounts 146, sharing assets 140 on linked SaaS accounts 146, authenticating users on linked SaaS accounts 146, installing plugins on linked SaaS accounts 146, manipulating assets 140 on linked SaaS accounts 146, changing user roles or account information on linked SaaS accounts 146, changing account passwords on linked SaaS accounts 146, etc.

At step 340, one or more databases 180 are maintained on the security enforcement platform 150 to track the permissions 185 for the data assets 140 stored on the one or more SaaS platforms 130. In some cases, for each SaaS account 146, the permissions associated with the data assets 140 may initially be determined at, or shortly after, the SaaS account 146 is integrated with the security enforcement platform 150 (e.g., by communicating with the corresponding SaaS platform 130 via an API 145 to access the permission information). Thereafter, the database 180 can be continuously or periodically update the permissions of the data assets 140 based on information included in the activity events 141.

At step 350, inputs for defining a remediation policy 171 are received that identifies target data assets selected from the data assets 140 for remediation. In some embodiments, the security enforcement platform 150 can present one or more GUIs that enable a user to provide inputs for defining a custom remediation policy 170, and to specify various filters for identifying a target set of data assets 140 for remediation. Additionally, or alternatively, the security enforcement platform 150 can provide a listing of predefined remediation policies 160, which can be selected by selected by the inputs via the GUI to define the remediation policy 171 to be enforced.

At step 360, the remediation policy 171 is executed by the security enforcement platform 150 by transmitting commands over the network to the one or more SaaS platforms 130 to modify the permissions corresponding to target data assets identified by the remediation policy 171. In some examples, the remediation component 170 associated with the security enforcement platform 150 can then communicate over the network 105 (e.g., the Internet) with the SaaS platforms 130 and/or SaaS accounts 146 that store the assets 140 to remediate the assets subject to the remediation policy 171. In some cases, the remediation component 170 can send commands via one or more APIs 145 associated with the SaaS platforms 130 and/or SaaS accounts 146 to modify or change the permissions (e.g. file permissions and/or sharing permissions) of the data assets 140 identified by the remediation policy 171.

As evidenced by this disclosure, the security techniques disclosed herein provide various advantages to users and organizations. One advantage is that the techniques described herein provide increased security for data assets stored on SaaS platforms, and operate to prevent data breaches and/or unauthorized access to the data assets. Another advantage is that a single, centralized security enforcement platform can be used to manage, track, and control permissions to data assets stored on remote systems and uniformly implement remediation policies across heterogeneous SaaS platforms. This centralized platform can increase operational efficiencies and avoid manual review of data asset permissions. Another advantage relates to the automated remediation functions that allows for bulk remediation of data assets on large scales. Another advantage is that the remediation policies can be defined and customized granularly to precisely identify target data assets for remediation. Many other advantages would be apparent to one of skilled in the art.

In certain embodiments, a computerized method is provided for remediating data assets on one or more service (SaaS) platforms. The method comprises: providing access to a security enforcement platform; integrating one or more SaaS accounts provided via one or more SaaS platforms with the security enforcement platform, each of the one or more SaaS accounts storing data assets; maintaining one or more databases on the security enforcement platform to remotely track the permissions for the data assets stored on the one or more SaaS platforms; receiving, by the security enforcement platform, inputs specifying a remediation policy relating to the data assets, wherein the security enforcement platform utilizes the permissions stored in the one or more databases to identify a target set of data assets for remediation; and executing, by the security enforcement platform, the remediation policy by transmitting commands over a network to the one or more SaaS platforms to modify the permissions corresponding to the target set of data assets identified by the remediation policy.

In certain embodiments, a system is provided for remediating data assets on one or more service (SaaS) platforms. The system includes one or more computing devices comprising one or more processing devices and one or more non-transitory storage devices that store instructions, wherein execution of the instructions by the one or more processing devices causes the one or more computing devices to: provide access to a security enforcement platform; integrate one or more SaaS accounts provided via one or more SaaS platforms with the security enforcement platform, each of the one or more SaaS accounts storing data assets; maintain one or more databases on the security enforcement platform to remotely track the permissions for the data assets stored on the one or more SaaS platforms; receive, by the security enforcement platform, inputs specifying a remediation policy relating to the data assets, wherein the security enforcement platform utilizes the permissions stored in the one or more databases to identify a target set of data assets for remediation; and execute, by the security enforcement platform, the remediation policy by transmitting commands over a network to the one or more SaaS platforms to modify the permissions corresponding to the target set of data assets identified by the remediation policy.

In certain embodiments, a computer program product is provided. The computer program product comprises a non-transitory computer-readable medium including instructions for causing a computing device to: provide access to a security enforcement platform; integrate one or more SaaS accounts provided via one or more SaaS platforms with the security enforcement platform, each of the one or more SaaS accounts storing data assets; maintain one or more databases on the security enforcement platform to remotely track the permissions for the data assets stored on the one or more SaaS platforms; receive, by the security enforcement platform, inputs specifying a remediation policy relating to the data assets, wherein the security enforcement platform utilizes the permissions stored in the one or more databases to identify a target set of data assets for remediation; and execute, by the security enforcement platform, the remediation policy by transmitting commands over a network to the one or more SaaS platforms to modify the permissions corresponding to the target set of data assets identified by the remediation policy.

In certain embodiments, another computerized method is provided for remediating data assets on one or more service (SaaS) platforms. The method comprises: providing access over a network to a security control platform; integrating one or more SaaS accounts provided via one or more SaaS platforms with the security control platform; receiving, by the security control platform, activity events over the network from the one or more SaaS accounts that identify permissions for data assets stored on the one or more SaaS platforms; maintaining one or more databases on the security control platform to track the permissions for the data assets stored on the one or more SaaS platforms; receiving, via the security control platform, inputs for defining a remediation policy that identifies target data assets selected from the data assets for remediation; and executing, by the security control platform, the remediation policy by transmitting commands over the network to the one or more SaaS platforms to modify the permissions corresponding to target data assets identified by the remediation policy.

In certain embodiments, another system is provided for remediating data assets on one or more service (SaaS) platforms. The system comprises one or more server devices accessible over a network and being configured to: provide access over a network to a security control platform; integrate one or more SaaS accounts provided via one or more SaaS platforms with the security control platform; receive, by the security control platform, activity events over the network from the one or more SaaS accounts that identify permissions for data assets stored on the one or more SaaS platforms; maintain one or more databases on the security control platform to track the permissions for the data assets stored on the one or more SaaS platforms; receive, via the security control platform, inputs for defining a remediation policy that identifies target data assets selected from the data assets for remediation; and execute, by the security control platform, the remediation policy by transmitting commands over the network to the one or more SaaS platforms to modify the permissions corresponding to target data assets identified by the remediation policy.

In certain embodiments, another computer program product is provided for remediating data assets on one or more service (SaaS) platforms. The computer program product comprises at least one non-transitory computer-readable medium including instructions for causing one or more computer devices to: provide access over a network to a security control platform; integrate one or more SaaS accounts provided via one or more SaaS platforms with the security control platform; receive, by the security control platform, activity events over the network from the one or more SaaS accounts that identify permissions for data assets stored on the one or more SaaS platforms; maintain one or more databases on the security control platform to track the permissions for the data assets stored on the one or more SaaS platforms; receive, via the security control platform, inputs for defining a remediation policy that identifies target data assets selected from the data assets for remediation; and execute, by the security control platform, the remediation policy by transmitting commands over the network to the one or more SaaS platforms to modify the permissions corresponding to target data assets identified by the remediation policy.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A computerized method for remediating data assets on one or more service (SaaS) platforms, the method comprising:
   providing access to a security enforcement platform;
   integrating one or more SaaS accounts provided via one or more SaaS platforms with the security enforcement platform, each of the one or more SaaS accounts storing data assets;
   maintaining one or more databases on the security enforcement platform to remotely track the permissions for the data assets stored on the one or more SaaS platforms;
   receiving, by the security enforcement platform, inputs specifying a remediation policy relating to the data assets, wherein the security enforcement platform utilizes the permissions stored in the one or more databases to identify a target set of data assets for remediation;
   in response to determining that one or more data assets within the target set of data assets include inherited permissions from a parent drive or a parent directory, remotely executing an analysis on the security enforcement platform to identify one or more collateral data assets, wherein the one or more collateral assets correspond to a subset of data assets stored on the one or more SaaS accounts that fall outside the remediation policy but which would be affected if the permissions of the parent directory or the parent drive were changed;
   presenting, by the security enforcement platform, one or more inherency handling options that enable a user to refine the remediation policy according to:
      a first remediation setting that causes the one or more collateral data assets to be included in the target set of data assets to be remediated; and
      a second remediation setting that excludes the one or more collateral data assets and the one or more data assets having the inherited permissions from the target set of data assets to be remediated; and
   executing, by the security enforcement platform, the remediation policy according to the first remediation setting or the second remediation setting based on a selection of the one or more options, wherein executing the remediation policy includes transmitting commands over a network to the one or more SaaS platforms to modify the permissions corresponding to the target set of data assets identified by the remediation policy.

2. The computerized method of claim 1, wherein:
   in addition to tracking the permissions for the data assets stored on the one or more SaaS platforms, the one or more databases store a file system storage hierarchy that identifies how those data assets are arranged or nested among directories or storage drives on the SaaS accounts; and
   the file system storage hierarchy is utilized, at least in part, to identify the one or more collateral data assets whose permissions would be affected if the permissions of the parent directory or the parent drive were changed.

3. The computerized method of claim 1, wherein:
   the permissions for the data assets stored on each of the one or more SaaS platforms are determined after or when the one or more SaaS accounts are integrated with the security enforcement platform;
   the security enforcement platform is configured to receive activity events over the network relating to the data assets; and
   the permissions for the data assets are updated, at least in part, based on the activity events.

4. The computerized method of claim 1, wherein:
   prior to executing the remediation policy, the security enforcement platform is configured to generate a remediation assessment report and present the remediation assessment report on one or more graphical user interfaces (GUIs); and
   the remediation assessment report is generated, at least in part, using the permissions stored in the one or more databases, and the remediation assessment report at least comprises:
      data relating to the target set of data assets identified for remediation;
      data relating to the one or more data assets included in the target set of data assets that are subject to the inherited permissions; and
      data relating to the one or more collateral assets that will be affected by changing the permissions of the one or more data assets having the inherited permissions.

5. The computerized method of claim 4, wherein the remediation assessment report further includes:
   the one or more inherency handling options for specifying how issues related to the inherited permissions are to be resolved; and
   an execution option that causes the remediation policy to be executed based, at least in part, on the first remediation setting or the second remediation setting.

6. The computerized method of claim 1, wherein:
   the security enforcement platform is configured to present one or more graphical user interfaces (GUIs) that enable the remediation policy to be defined and customized; and
   the one or more GUIs include customizable filters that are utilized to identify the target set of data assets for remediation.

7. The computerized method of claim 1, wherein:
   executing the remediation policy includes transmitting commands over the network to one or more application programming interfaces (APIs) associated with the one or more SaaS platforms; and
   the commands are utilized to modify file permissions or sharing permissions corresponding to the target set of data assets identified by the remediation policy.

8. The computerized method of claim 7, wherein the commands transmitted by the security enforcement platform to the one or more APIs cause parallel processing functionalities provided by the one or more SaaS platforms to be executed in connection with remediating the permissions of the target set of data assets.

9. A system for remediating data assets on one or more service (SaaS) platforms, wherein the system includes one or more computing devices comprising one or more processing devices and one or more non-transitory storage devices that store instructions, wherein execution of the instructions by the one or more processing devices causes the one or more computing devices to:
   provide access to a security enforcement platform;
   integrate one or more SaaS accounts provided via one or more SaaS platforms with the security enforcement platform, each of the one or more SaaS accounts storing data assets;
   maintain one or more databases on the security enforcement platform to remotely track the permissions for the data assets stored on the one or more SaaS platforms;

receive, by the security enforcement platform, inputs specifying a remediation policy relating to the data assets, wherein the security enforcement platform utilizes the permissions stored in the one or more databases to identify a target set of data assets for remediation;

in response to determining that one or more data assets within the target set of data assets include inherited permissions from a parent drive or a parent directory, remotely execute an analysis on the security enforcement platform to identify one or more collateral data assets, wherein the one or more collateral assets correspond to a subset of data assets stored on the one or more SaaS accounts that fall outside the remediation policy but which would be affected if the permissions of the parent directory or the parent drive were changed;

present, by the security enforcement platform, one or more inherency handling options that enable a user to refine the remediation policy according to:
  a first remediation setting that causes the one or more collateral data assets to be included in the target set of data assets to be remediated; and
  a second remediation setting that excludes the one or more collateral data assets and the one or more data assets having the inherited permissions from the target set of data assets to be remediated; and execute, by the security enforcement platform, the remediation policy according to the first remediation setting or the second remediation setting based on a selection of the one or more options, wherein executing the remediation policy includes transmitting commands over a network to the one or more SaaS platforms to modify the permissions corresponding to the target set of data assets identified by the remediation policy.

10. The system of claim 9 wherein:
in addition to tracking the permissions for the data assets stored on the one or more SaaS platforms, the one or more databases store a file system storage hierarchy that identifies how those data assets are arranged or nested among directories or storage drives on the SaaS accounts; and
the file system storage hierarchy is utilized, at least in part, to identify the one or more collateral data assets whose permissions would be affected if the permissions of the parent directory or the parent drive were changed.

11. The system of claim 9, wherein:
the permissions for the data assets stored on each of the one or more SaaS platforms are determined after or when the one or more SaaS accounts are integrated with the security enforcement platform;
the security enforcement platform is configured to receive activity events over the network relating to the data assets;
the permissions for the data assets are updated, at least in part, based on the activity events.

12. The system of claim 9, wherein:
prior to executing the remediation policy, the security enforcement platform is configured to generate a remediation assessment report and present the remediation assessment report on one or more graphical user interfaces (GUIs); and
the remediation assessment report is generated, at least in part, using the permissions stored in the one or more databases, and the remediation assessment report at least comprises:
  data relating to the target set of data assets identified for remediation;
  data relating to the one or more data assets included in the target set of data assets that are subject to the inherited permissions; and
data relating to the one or more collateral assets that will be affected by changing the permissions of the one or more data assets having the inherited permissions
  the one or more inherency handling options for specifying how issues related to the inherited permissions are to be resolved; and
  an execution option that causes the remediation policy to be executed based, at least in part, on the first remediation setting or the second remediation setting.

13. The system of claim 9, wherein:
the security enforcement platform is configured to present one or more graphical user interfaces (GUIs) that enable the remediation policy to be defined and customized; and
the one or more GUIs include customizable filters that are utilized to identify the target set of data assets for remediation.

14. The system of claim 9, wherein:
executing the remediation policy includes transmitting commands over the network to one or more application programming interfaces (APIs) associated with the one or more SaaS platforms; and
the commands are utilized to modify file permissions or sharing permissions corresponding to the target set of data assets identified by the remediation policy.

15. The system of claim 14, wherein the commands transmitted by the security enforcement platform to the one or more APIs cause parallel processing functionalities on the one or more SaaS platforms to be executed in connection with remediating the permissions of the target set of data assets.

16. A computer program product, the computer program product comprising a non-transitory computer-readable medium including instructions for causing a computing device to:
provide access to a security enforcement platform;
integrate one or more SaaS accounts provided via one or more SaaS platforms with the security enforcement platform, each of the one or more SaaS accounts storing data assets;
maintain one or more databases on the security enforcement platform to remotely track the permissions for the data assets stored on the one or more SaaS platforms;
receive, by the security enforcement platform, inputs specifying a remediation policy relating to the data assets, wherein the security enforcement platform utilizes the permissions stored in the one or more databases to identify a target set of data assets for remediation;
in response to determining that one or more data assets within the target set of data assets include inherited permissions from a parent drive or a parent directory, remotely execute an analysis on the security enforcement platform to identify one or more collateral data assets, wherein the one or more collateral assets correspond to a subset of data assets stored on the one or more SaaS accounts that fall outside the remediation policy but which would be affected if the permissions of the parent directory or the parent drive were changed;

present, by the security enforcement platform, one or more inherency handling options that enable a user to refine the remediation policy according to:
- a first remediation setting that causes the one or more collateral data assets to be included in the target set of data assets to be remediated; and
- a second remediation setting that excludes the one or more collateral data assets and the one or more data assets having the inherited permissions from the target set of data assets to be remediated; and execute, by the security enforcement platform, the remediation policy according to the first remediation setting or the second remediation setting based on a selection of the one or more options, wherein executing the remediation policy includes transmitting commands over a network to the one or more SaaS platforms to modify the permissions corresponding to the target set of data assets identified by the remediation policy.

\* \* \* \* \*